United States Patent Office 2,978,217
Patented Apr. 4, 1961

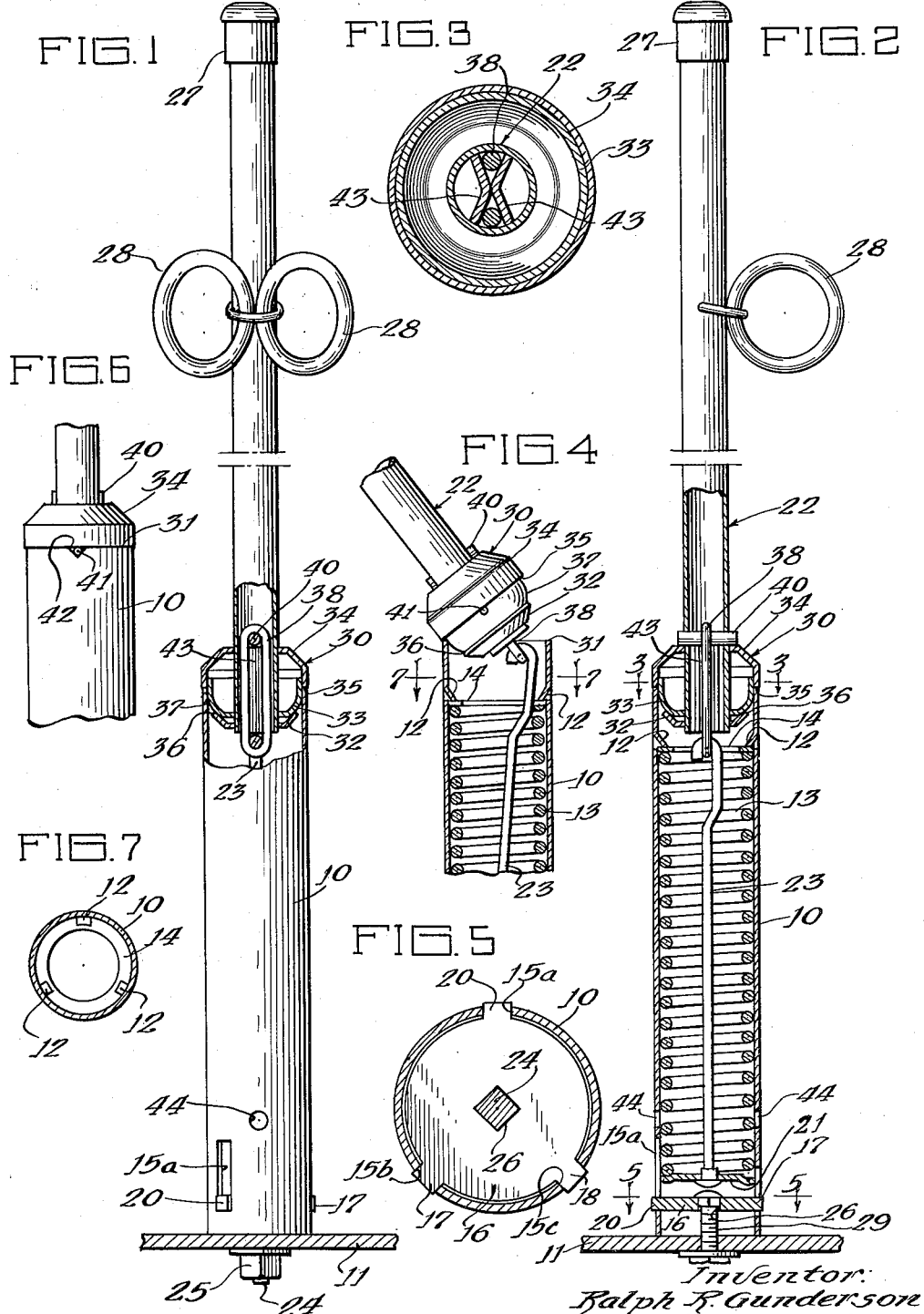

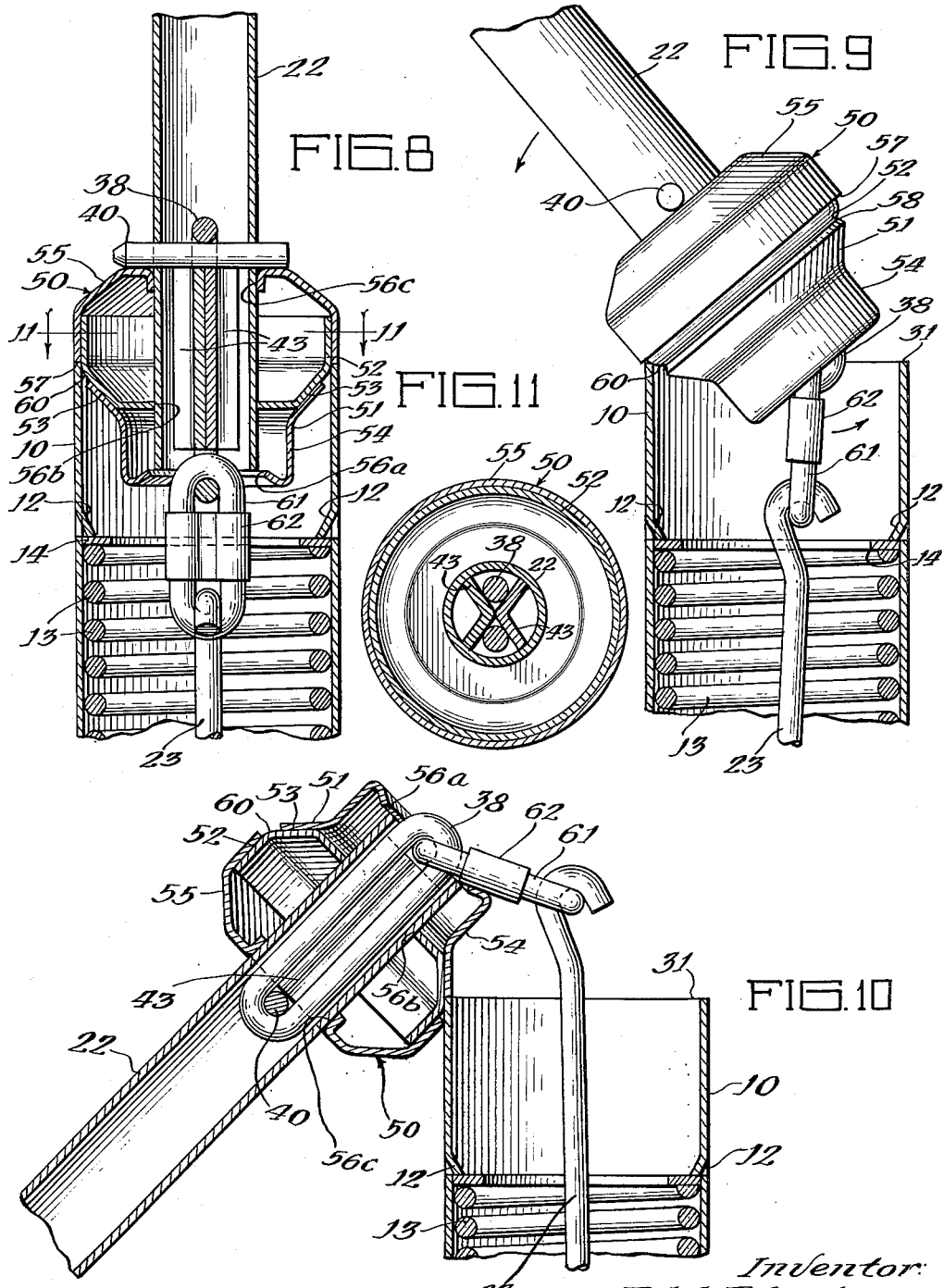

2,978,217
YIELDING SUPPORT FOR VEHICLE HOSE LINES
Ralph R. Gunderson, 5520 South Shore Drive, Chicago, Ill.
Filed Nov. 19, 1958, Ser. No. 775,052
6 Claims. (Cl. 248—204)

The present invention relates to an improved support for holding brake hoses of a tractor of the type used to pull trailers upon the highway, and more particularly to a yielding support which will return to an upright position when released from a tilting position.

The present application is a continuation-in-part of my abandoned copending application, Serial No. 607,371, filed August 31, 1956.

Tractor-trailer vehicles commonly in use on the highway today are provided with air brakes. Flexible air hoses are used to convey compressed air from the tractor to the brake mechanism on the trailer, and it is convenient to hold them upon an upright hose support mounted on the rear platform of the tractor. Preferably, the hose support is tiltable or yieldable. Two such yieldable hose supports are disclosed in my U.S. Patents Nos. 2,715,006 and 2,733,033.

In some yielding supports, the tiltable staffs fail to return to upright position when released from a tilted position. This is caused by loss of leverage in the force being applied to swing the staff back to its normal upright position. The base of the tiltable staff is laterally displaced so that there is no longer a lever arm through which the force can act. In the illustrated structure of one embodiment of the present invention, the base of the tiltable staff is prevented from becoming displaced even when the staff is tilted a little beyond 90° from its normal position. In a second embodiment of the invention, structure is provided to afford increased leverage for applied forces so that the staff may be swung through an even greater arc and yet return to upright position when released.

The primary object of the present invention is to provide a new and improved support for vehicle hose lines.

Another object is to provide a vehicle hose support having a tiltable staff which will recenter and reseat itself in upright position upon a fixed housing on the vehicle frame after being tilted.

A further object is to provide a hose support having a tiltable staff with a base portion which may be readily seated upon the open end of a tubular housing fixed to the tractor frame.

Another object is to provide a novel base plate for a hose support to enable the support to be quickly and conveniently assembled.

Still another object is to provide a hose support provided with structure for affording increased leverage for the forces of the spring member urging the tiltable staff toward upright position.

Yet another object is to provide a hose support having a structure which will prevent the loss of leverage in spring forces urging the tiltable staff to upright position and which will permit the tiltable staff to be swung through the maximum required arc.

The invention is illustrated in a preferred embodiment in the accompanying drawings, in which:

Fig. 1 is a side elevational view of the hose support with certain parts broken away to illustrate the internal structure of the support;

Fig. 2, a view similar to Fig. 1, taken from the right of Fig. 1 showing additional parts broken away;

Fig. 3, a sectional view taken as indicated on line 3—3 of Fig. 2;

Fig. 4, a fragmentary side elevational view partly in section, showing the relative position of the parts when the staff is tilted;

Fig. 5, a sectional view taken as indicated on line 5—5 of Fig. 2;

Fig. 6, a fragmentary side elevational view illustrating a pin on the tiltable staff positioned within a notch on the fixed tubular housing;

Fig. 7, a sectional view taken as indicated on line 7—7 of Fig. 4;

Fig. 8, an enlarged fragmentary sectional view, similar to a portion of Fig. 2, illustrating a modified form of the hose support;

Fig. 9, an enlarged fragmentary view partly in section and similar to Fig. 8 showing the staff being tilted so that the base portion of the staff is about to bear against the auxiliary link to carry the link in a direction opposite to the direction of tilt;

Fig. 10, an enlarged fragmentary sectional view showing the staff at the maximum required tilted angle and illustrating the auxiliary link bearing against the base portion of the staff and affording increased leverage for the spring force to enable the staff to be returned to upright position; and Fig. 11, a sectional view taken as indicated on line 11—11 of Fig. 8.

In the embodiment illustrated in Figs. 1 through 7, a fixed tubular housing 10 is mounted in upright position, and fixedly secured, to a bracket 11 which in turn is secured to the rear platform of a tractor. As best seen in Fig. 7, the upper portion of the tubular housing 10 is provided with a plurality of studs 12 struck inwardly from the lateral surface of the housing 10. The studs 12 function as bearing surfaces for the upper end of a strong coil spring 13 positioned within the tubular housing 10. If desired, a washer 14 may be provided intermediate the upper end of the spring 13 and the studs 12.

The lower end portion of the housing 10 is preferably provided with three slots 15a, 15b and 15c, as best shown in Figs. 1 and 5. Slot 15a is preferably longer than the two slots 15b and 15c, which are arranged closer to each other than they are to the slot 15a, as shown in Fig. 5. The slots are utilized to mount a base plate 16 which has a plurality of peripheral fingers or projections 17, 18, and 20, positioned a distance apart corresponding to the slots 15a, 15b and 15c. It will be noted from Fig. 5 that the straight line distance between the outer extremities of the fingers 17 and 18 is preferably slightly less than the inner diameter of the tubular housing 10. Such an arrangement permits the base plate 16 to be angularly inserted during assembly, finger 20 inserted first, through the lower open end of the housing 10 so that the fingers 17 and 18 may be positioned in the bottom ends of the two slots 15b and 15c which are closest together. The finger 20 may then be lowered from an inclined position into the third and longest slot 15a, shown in Fig. 1.

As best shown in Fig. 2, the coil spring 13 is provided at its lower end with a follower 21 which is connected to a tiltable tubular staff, generally designated 22, by an elongated hook member 23. When in its normal position, the coil spring 13 retains the follower 21 against, or closely adjacent, the base plate 16 so that the base plate 16 cannot become disengaged from the slots 15 prior to attaching the hose support to the tractor. The tubular housing 10 is conventionally secured to the bracket 11 and in turn to the platform of the tractor. To this end, a bolt 24 is passed through a central opening 26 in the base plate 16 and then through the bracket 11, and a nut 25 is provided to secure the parts together.

The tiltable staff 22 is preferably metallic and tubular and may have a protective cap 27 of rubber or other resilient material at its upper end. Brake hose holders, herein shown as rings 28 may be secured in a conventional manner to an upper portion of the staff 22.

The lower or base portion, generally designated 30, of the staff 22 is adapted to rest upon a narrow annular seat 31 at the upper end of the tubular housing 10. The lower part of the base portion 30 may be formed in a bulb-like projection from a pair of cup-shaped members 32 and 33 which may be spot-welded together. The members 32 and 33 are provided with aligned central openings of a size to permit them to be press-fitted about the lower end of the staff 22. The member 33 is then in turn press-fitted into a third cup-shaped member 34 which also has a central opening making a tight fit with the outer surface of the staff 22 to form the base portion 30.

As best seen in Fig. 4, when the three cup-shaped members 32, 33, and 34 are fitted together, an upper annular shoulder 35 and a lower annular shoulder 36 are provided and define therebetween an annular groove 37 having a convex outer surface. When the staff 22 is in upright position and in alignment with the tubular housing 10, the bulb-like projection of the base portion 30 nests within the open end of the tubular housing 10 and the annular shoulder 35 rests upon the seat 31 of the housing 10.

The tiltable staff 22 is interconnected with the link 23 in the housing 10 by a chain-type link or loop 38 which is positioned within the lower end of the tubular staff 22 and encircles a pin 40 driven transversely through the staff 22.

As best seen in Fig. 6, the base portion 30 may be provided with an outwardly projecting pin 41 of a size to be received in a notch 42 at the upper end of the tubular housing 10. This arrangement assists in preventing the staff 22 from rotating on its longitudinal axis and properly positions the rings 28 for receiving and holding the vehicle hose lines. Although the pin 41 may be raised out of the notch 42 during tilting of the staff 22, it normally reseats in the notch 42 when the tilting forces are removed. If the pin 41 and notch 42 should get out of alignment, the staff 22 may be turned to realign them.

The link or loop 38 may be held centered in the base portion 30. To this end, the link 38 is firmly anchored in place by a pair of opposed wedge members 43 which are driven into the lower end of the staff 22 and occupy positions substantially as shown in section in Fig. 3. In addition to centering the loop 38, the wedge members 38 absorb the lateral thrust exerted upon the loop 38 when the staff 22 is tilted.

In order to assemble the embodiment shown in Figs. 1 through 7, the staff 22 and its base portion 30 are initially assembled as a separate unit. The spring 13 is then inserted into the tubular housing so as to rest against the inwardly struck studs 12 and the washer 14, and the follower 21 and its hook member 23 are then inserted. The spring is next compressed into the tubular housing 10, upwardly as seen in Fig. 2, and a pin is inserted in an opening 44 in the lower part of the housing 10 (as seen in Fig. 1) so that the spring is held in a compressed state. The base plate 16 is next inserted into the slots 15 in the manner previously described, and the link 38 is engaged about the hook member 23 to interconnect the staff 22 and the housing 10. The compression of the spring is then released so that the follower 21 moves downwardly against, or closely adjacent, the base plate 16 to retain the base plate in its slots in the lower end of the tubular housing 10.

When the hose support of this embodiment is in use, and no lateral forces are acting upon the staff 22, the staff is normally in alignment with the longitudinal axis of the housing 10, and the base portion 30 is fully seated upon the open end of the housing 10, as shown in Fig. 2. When the staff 22 is tilted, as shown in Fig. 4, to attach the hose lines or for other reasons, the staff 22 is fulcrumed on the upper shoulders 35 and seat 31. During tilting, the bottom of the link 38 is lifted which raises the hook member 23 and compresses the strong coiled spring 13 between the follower 21 and the inwardly struck shoulders 12. When the lateral tilting force is removed from the staff 22, the bulb-like base portion 30 normally is re-centered by the downward force of the compressed spring 13 and by the guiding action of the annular groove 37 so that the annular shoulder 35 re-engages the seal 31 of the housing 10.

If the tilting force is sufficient to pivot the staff to the horizontal, the bulb-like portion 30 may be moved in a lateral direction so that the annular shoulder 35 no longer contacts the seat 31. In the first embodiment such lateral movement is almost immediately arrested by contact between the lower annular shoulder 36 and the upper edge of the tubular housing 10 so that leverage is maintained for the spring force acting through the hook member 23. Thus, when the tilting force is removed, the staff 22 is urged back to its upright position, and the bulb-like portion 30 rides downwardly on the convex surface of its annular groove 37 to automatically re-center itself upon the seat 31 of the housing 10. This recentering and reseating feature of the bulb-like portion 30 assures that the staff 22 will never be disposed at an angle with respect to longitudinal axis of the housing 10 when tilting forces are removed provided that the angle of tilt is not so great as to cause the lower shoulder 36 to slip laterally off the seat 31 of the housing 10 so that the leverage of the spring force is lost.

In the structure of the second embodiment shown in Figs. 8 through 11, a yielding hose support is provided having a tiltable staff which will return to upright position even when the staff is forced to swing through a most severe angle, as illustrated in Fig. 10. This result is accomplished through the provision of structural means which affords adequate leverage for the spring force tending to return the staff to upright position even when the base portion of the staff has swung completely out of and is displaced laterally of, the housing 10.

The tubular housing 10 and the base plate 16 together with the spring 13, its follower 21 and the elongated hook member 23 are preferably formed in the same manner as illustrated in Fig. 2 and are designated by corresponding numbers. The staff 22 and its loop 38 which is centered by the opposed wedge members 43 are also preferably formed as in the embodiment illustrated in Figs. 1 through 7. However, a base portion 50 having a different structural formation is provided at the lower end of the staff 22.

This base portion 50 has a lower part formed from a pair of dished members 51 and 52 which are peripherally spot-welded together in their adjoining surfaces at 53. The dished member 51 is preferably provided with a depending cylindrical surface or peripheral wall 54 surrounding and spaced from the lower end of the staff 22 to afford a recessed chamber in the base portion 50 which extends into the upper end of the housing 10. The dished member 51 is constructed and arranged for cooperation with a link member to be described later.

The dished member 52 may be in turn press-fitted into an inverted dished member 55 to complete the base portion 50. Central openings 56a, 56b and 56c are respectively provided in the three dished members 51, 52 and 55. Openings 56b and 56c are preferably of a size so that the dished members 52 and 55 make a tight press fit about the outer surface of the lower end of the staff 22 to secure the base portion 50 to the staff.

As in the first embodiment, the formation of the three dished members is such as to provide an upper annular shoulder 57 and a lower annular shoulder 58 which defines between them an annular groove 60. When the staff 22 is in upright position and in axial alignment with the tubular housing, the base portion extends into the open end of the tubular housing, and the annular shoulder 57 rests upon its seat at the open end of the housing 10.

In the second embodiment, connecting means is provided in the form of an auxiliary or connecting link 61 which joins the loop 38 to the upper end of the elongated hook 23. As herein shown, it is in the form of a chain link so that it is freely pivotable at its opposite or connected ends. Preferably, a reinforcing bearing or pressure plate 62 is provided encircling the connecting link 61 to lend added strength and to serve as a bearing surface for engagement with the lower end of the base portion 50, as will be more fully explained later.

The purpose of the connecting link 61 is to provide adequate leverage at all times for the spring force acting through the elongated hook 23 so that the staff 22 will be returned to upright position automatically in spite of the most severe tilt, as illustrated in Fig. 10. To illustrate further, assume the staff 22 is initially tilted in the manner shown in Fig. 9. The base portion 50 is initially pivoted on the seat at the open end of the housing 10 and about a point on the upper annular shoulder 57. As the tilting continues, the point of pivot on the base portion 50 shifts across the annular groove 60 to the lower annular shoulder 58. At about this time, the lower end or annular pick-up surface of the dished member 51 picks up or bears against the pressure plate 62 of the auxiliary link 61. This is about to occur in Fig. 9. Further tilting then causes the lower end of the base portion 50 to swing the lower end of the link upwardly substantially axially of the housing 10 and in a direction opposite to the direction of tilt (as indicated by the arrows in Fig. 9) so that adequate leverage for the force of the spring is maintained.

Even after the staff 22 is tilted beyond 90°, as illustrated in Fig. 10, it will be returned to upright position. In Fig. 10, the base portion 50 is shown displaced laterally and swung completely out of the housing 10. In this position the auxiliary link 61 is still bearing against the lower end of the base portion 50 and affords a lever arm through which the greatly increased force of the compressed spring 13 may act. Thus, the auxiliary link 61 assures that the spring force will continue to act substantially axially of the housing 10 even when the staff is tilted to its most severe angle so that adequate leverage is always maintained. Just as in the first embodiment, the formation of the base portion 50 assists in guiding the staff back to upright position with the annular shoulder 57 seated upon the open end of the housing.

The foregoing detailed description is given for clearness of understanding only and no unnecessary limitations should be understood therefrom as some modifications will be obvious to those skilled in the art.

I claim:

1. A yielding support for vehicle hose lines, comprising: a tubular housing having an open upper end portion with an annular seat and a lower end portion provided with a number of peripherally spaced slots; a base plate mounted in the lower portion of the tubular housing and provided with securing means for attaching said tubular housing to a vehicle platform, said base plate having a plurality of projecting, peripheral fingers each spaced to fit in one of said slots; a staff having a base portion, said staff being tiltable relative to said housing with said base portion resting on said annular seat when the staff is in upright position; a follower positioned adjacent said base plate in the lower portion of the tubular housing; a link joining the follower to the staff; and a compression spring disposed in said tubular housing and bearing between said follower and the upper end portion of the tubular housing to permit yielding tilting movement of said staff from upright position, said spring normally maintaining the follower in position adjacent said base plate to maintain the fingers of the base plate in the slots of the tubular housing prior to attachment of the support to a vehicle platform.

2. A yielding support as specified in claim 1 in which the base plate has three peripheral fingers and the housing has three corresponding slots, one of the slots being longitudinally longer than the other two, an adjacent pair of said fingers having their extremities spaced apart a distance less than the diameter of the housing so that said pair of fingers can be readily inserted in said other two slots from within said housing and the third finger can be inserted in said elongated slot.

3. A yielding support for vehicle hose lines, comprising: a tubular housing adapted to be secured to a platform on the vehicle and being provided with an open upper end affording a narrow annular seat; a staff tiltable relative to the housing and having a base portion positioned on said seat of the housing when the staff is in upright position and pivoting on said seat when the staff is tilted, said base portion having a lower end extending downwardly into the housing and terminating in a depending peripheral wall to afford an annular pick-up surface, said depending peripheral wall defining a recessed chamber in said lower end; a connecting link flexibly secured at one end within said recessed chamber to the base portion of the staff so as to be substantially axially immovable and having its other end extending axially downwardly therefrom into the tubular housing when the staff is in upright position, said link being of such length and the annular pick-up surface being constructed and positioned relative to said link so that during tilting of the staff through an acute angle with respect to the housing, the pick-up surface cooperatively engages the link in its medial portion and swings the other end of the link transversely of the housing in an arcuate path directed opposite to the direction of tilting and upwardly past the open end of the housing to afford a projecting lever arm for forces tending to urge the staff toward upright position; and spring means disposed in said tubular housing and being flexibly joined to said other end of the link to exert progressively increased forces on said other end as the link swings upwardly during increased tilting of the staff, said link and spring means thereby affording an increasing moment of force urging the staff toward upright position as tilting of the staff is increased.

4. A yielding support as specified in claim 3, in which the connecting link is in the form of a chain link and a bearing plate is provided encircling and reinforcing the medial portion of the chain link, said bearing plate affording a surface for engagement with the annular pick-up surface of the peripheral wall during tilting of the staff.

5. A yielding support for vehicle hose lines as specified in claim 3, in which the base portion has a laterally extending peripheral shoulder spaced downwardly from the seat on the housing whereby during tilting of the staff said peripheral shoulder will abut the seat on the housing and afford a secure pivot for the base portion on the housing seat.

6. A yielding support for vehicle hose lines, comprising: a tubular housing adapted to be secured to a platform on the vehicle and being provided with an open upper end affording a narrow annular seat; a staff tiltable relative to the housing and having a base portion positioned on said seat of the housing when the staff is in upright position and pivoting on said seat when the staff is tilted, said base portion having a lower end extending downwardly into the housing and terminating in a depending peripheral wall to afford an annular pick-up surface, said depending peripheral wall defining a recessed chamber in said lower end; connecting means flexibly secured at one end within said recessed chamber to the base portion of the staff so as to be substantially axially immovable and having its other end extending axially downwardly therefrom into the tubular housing when the staff is in upright position, said connecting means being positioned so that during tilting of the staff through an acute angle with respect to the housing, the pick-up surface cooperatively engages and moves said connecting means transversely of the housing in a direction opposite to the direction of tilting and upwardly past the open end of the housing to afford increased leverage for forces tending to urge the staff toward upright position; and spring means disposed in said tubular housing and being flexibly joined to said other end of the connecting means to exert progressively increased forces on the connecting means during increased tilting of the staff whereby the connecting means and spring means afford increasing moments of force urging the staff toward upright position.

References Cited in the file of this patent

UNITED STATES PATENTS

| | | |
|---|---|---|
| 903,242 | Thayer | Nov. 10, 1908 |
| 1,313,616 | Walsh | Aug. 19, 1919 |
| 1,435,363 | Wood | Nov. 14, 1922 |
| 2,652,266 | Miller | Sept. 15, 1953 |
| 2,670,917 | Hoffman | Mar. 2, 1954 |
| 2,724,996 | O'Shei | Nov. 29, 1955 |